March 11, 1969 N. T. NEAPOLITAKIS ET AL 3,432,840

FLUID LEVEL INDICATOR

Filed Sept. 28, 1965

Inventors
NICHOLAS T. NEAPOLITAKIS
WILLIAM H. WHITE JR.
BY
ATTYS.

United States Patent Office 3,432,840
Patented Mar. 11, 1969

3,432,840
FLUID LEVEL INDICATOR
Nicholas T. Neapolitakis, Chicago, and William H. White, Jr., Wheaton, Ill., assignors to Motorola, Inc., Franklin Park, Ill., a corporation of Illinois
Filed Sept. 28, 1965, Ser. No. 490,910
U.S. Cl. 340—244
Int. Cl. G08b 21/00
1 Claim

ABSTRACT OF THE DISCLOSURE

A fluid level indicator including a thermistor and a heating element in combination. Absence of fluid surrounding the indicator probe permits the heating element to heat the thermistor. The changing resistance of the thermistor energizes a transistor which gates on a silicon controlled rectifier to actuate an alarm.

---

This invention relates to a fluid level indicator and more particularly to a fluid level sensor device including a heat responsive element in order to indicate the level of fluid in a container.

It is well known that a thermistor can be used as a fluid level indicator. When such thermistor is connected in an electrical circuit the resistance varies with its temperature. For a liquid level sensing device, for example, in the coolant of an automobile, the temperature of the thermistor varies in accordance with the heat conducting quality of the coolant to which the thermistor is subjected. There is, therefore, a change in resistance when the liquid level drops off and the thermistor is surrounded with air instead of liquid. However, the speed of change depends on the time which the thermistor needs for warming up in response to the flow of current therethrough; the speed of change also depends on the ambient temperature. This time usually is very objectionably too long.

It is an object of the present invention to provide a new and improved system for indicating liquid level in a container.

A further object of this invention is to provide a simple, electrically operated, fluid level indicating system using an inexpensive circuit utilizing a thermistor.

Another object of this invention is to provide a fluid level indicating system with a very short delay time.

A feature of the present invention is the provision of a fluid level indicator for use with a fluid container which indicator comprises a thermistor and a heating element in combination with indicating means which reacts when heat transmission takes place, caused by the absence of the fluid, between the heating element and the thermistor.

Another feature of the invention is the provision of a fluid level indicator for a coolant wherein material having high heat conductivity is positioned between the heating element and the thermistor for heat transmission therebetween, with the heat transmission being rendered ineffective by the cooling of the material by the coolant.

Figure 1:
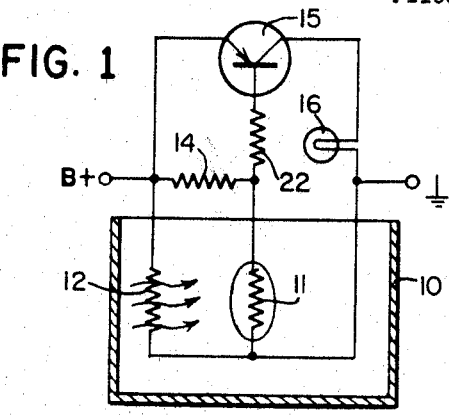
FIG. 1 shows a schematic diagram of a fluid level indicator of the present invention.

In brief, the present invention may be utilized advantageously in a fluid container for indicating the level of fluid. The fluid level indicator includes a negative temperature coefficient thermistor mounted inside a casing of high thermal conductivity type material located at a predetermined level in the container. Also a heater is mounted inside the casing transmitting heat through the high thermal conductivity type material. The thermistor is located in a spaced position to the heating element to be heated by heat transmission through the high thermal conductivity type material. When the fluid level is high, the fluid contacts the high thermal conductivity material to remove heat therefrom. In the absence of the fluid, heat is conducted to the thermistor by the material. The heater is connected to a voltage supply in parallel to the thermistor which is series connected to a resistor. The input of a transistor is coupled to the junction of the thermistor and the resistor whereas the output of the transistor is connected to an alarm device. The transistor is sensitive to the change of voltage ratio across the resistor and the thermistor and indicates the absence of the heat transmission preventing fluid by becoming conductive and energizing the alarm device.

In the drawings identical parts have been given identical reference characters.

Referring now particularly to FIG. 1, an indicator system is illustrated for indicating the level of liquid in a tank or container 10. A negative temperature coefficient (NTC) thermistor 11 and a heater 12 being positioned at a level in the container 10 below which an alarm or control should be released. The thermistor 11 and heater 12 are provided with suitable mounting means, and these may be of the type shown in FIG. 4. The indicator system includes a direct current voltage source which may be the voltage source of an automobile. Between the voltage source and the ground potential there are connected in parallel heater 12, thermistor 11 in series with resistor 14, and a transistor 15 series connected to an alarm bulb 16. The base of transistor 15 is connected to the junction of resistor 14 and thermistor 11 through the resistor 22.

When the liquid level is such that thermistor 11 and heater 12 are submerged in the liquid, the liquid will effectively block the heat transmission symbolized by three arrows so that the thermistor will remain cool. Thus, because of the negative temperature coefficient of the thermistor 11, the voltage drop across thermistor 11 is large in comparison with the voltage drop across resistor 14, which has a low resistance value.

However, when the liquid level is below thermistor 11 and heater 12, the heat transmission will raise the temperature of the thermistor and will cause the decrease of its resistance and the increase of voltage drop across resistor 14. Thus, the base of transistor 15 is provided with enough bias to render the transistor conductive so that the alarm bulb 16 is energized and actuated.

Figure 2:
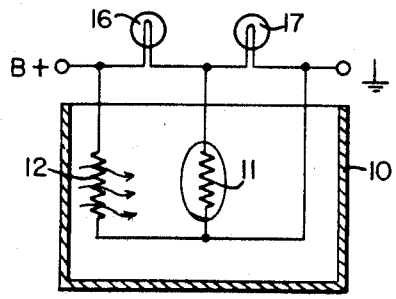
FIG. 2 shows a schematic diagram of another embodiment of the fluid level indicator according to the invention.

The indicator system according to FIG. 2 shows a combination for providing a filament continuity check and includes an alarm bulb 16 and a filament checking lamp 17. The alarm bulb 16 is series connected to the NTC thermistor 11. Both are connected between voltage source and ground potential in parallel to the heater 12. The filament checking lamp 17 is connected between the reference potential and the junction of alarm bulb 16 and thermistor 11.

The resistance value of alarm bulb 16 and filament checking lamp 17 is such that, when the coolant is no longer available to interrupt the heat transmission and to cool the thermistor 11, the heater 12 causes the resistance of the thermistor to decrease to a value much smaller than the resistance of lamp 17. Thus, the current flows through the alarm bulb 16 increases and lights the bulb 16. Since the current flow now mainly goes through the thermistor 11, the filament checking lamp 17 goes out.

The lamp filament and thermistor characteristics are so designed that when the coolant makes contact with this sensor the thermistor resistance is too high to effect the operation of the two bulbs. The lamp filament characteristics are so designed that, when the two lamps are in series across 12 to 15 volts, the common current is enough to light the filament checking lamp 17, but not enough to light the larm bulb 16. When the alarm bulb begins to glow, the filament checking lamp will dim and be completely out by the time the alarm bulb has reached full intensity. When the system is operating normally and there is sufficient coolant, only the filament checking lamp will be visible. The advantage of this indicating system is that, if either the bulb or lamp has a broken filament, the filament checking lamp will not light. This indicates to the user that a change of lamp or bulb is required.

One of the unique features of the device is that while the warning lamp 16 is cold, it has low resistance and the thermistor has virtually the full system voltage across it. This causes the thermistor to heat up and make it thermally unstable and sensitive while the coolant is in contact with the sensor. As the coolant level decreases and contact with the sensor is reduced, this instability of the thermistor due to the low resistance of bulb 16 helps the thermistor to heat up rapidly, but as the bulb lights the current through the warning bulb to the thermistor drops. This prevents the thermistor from overheating to destruction. In effect, the design of the warning bulb also acts as a thermal switch to protect the thermistor. It is on when the thermistor is cold and off when the thermistor is hot, and therefore it helps the thermistor to switch from hot to cold rapidly.

Figure 3:
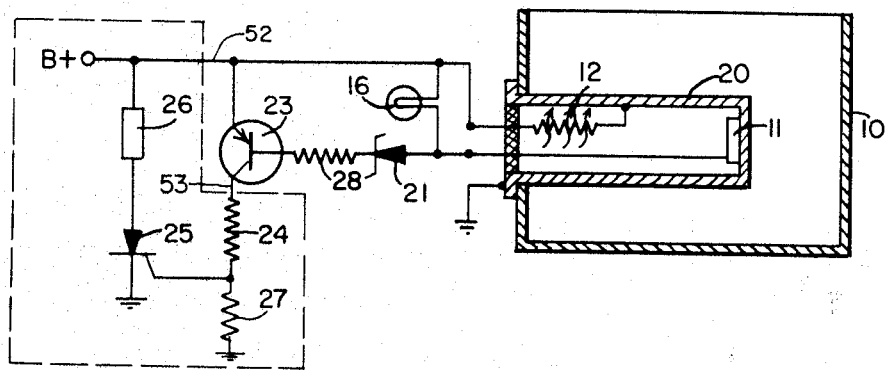
FIG. 3 shows a schematic diagram of a further fluid level indicator.

Sometimes it is desired that with failure of coolant, not only an alarm signal should be produced, but also automatic control reactions should be caused in order to protect the device being cooled against damage. A simple fluid level indicator system, which meets this requirement, is illustrated in FIG. 3. There is a container 10 shown for the coolant, in the wall of which container there is mounted at a predetermined level, a sensing device including thermistor 11 and heater 12. The sensing device has a heat conductive shell 20, in which the heater 12 is spaced far enough away from thermistor 11 so that the heat transmission from heater to thermistor occurs only through the shell 20. When, however, the shell is surrounded by the coolant, the heat is drained away, and the NTC thermistor is cooled so that the resistance of the thermistor 11 is quite high. The thermistor is series connected to an alarm bulb 16, and both are connected in parallel to the heater 12 between a voltage source and a ground potential. A transistor 23 is connected with its emitter to the voltage source, and its base coupled through a Zener diode 21 and a series resistor 28 to the junction of bulb 16 and thermistor 11. The collector of transistor 23 is connected through a resistor 24 to the gate of a silicon controlled rectifier 25 which is series connected to an alarm load 26 between voltage source and reference potential. Resistor 27 is used to prevent false-triggering of the silicon controlled rectifier. It is provided for that the alarm load 26 may be any kind of electromagnetic control element, e.g., a control relay for ignition cut out of an automobile, or an electromagnetic controlled valve. The alarm element is energized by the absence of the coolant.

When the level of liquid in the container 10 drops to a level so that the shell 20 is no longer cooled, the heat is transmitted from heater 12 to thermistor 11, and its resistance rapidly decreases. Thereby the current through alarm bulb 16 increases so that the bulb lights up and the voltage at the junction of thermistor 11 and alarm bulb 16 is low enough to overcome the reverse blocking of the Zener diode 21. Thus current flows to the base of transistor 23 rendering the emitter-collector path conductive. This current flow through transistor 23 increases the gate current of the silicon controlled rectifier 25 over the forward breakover voltage so that high conduction takes place energizing the alarm load 26.

Figure 5:
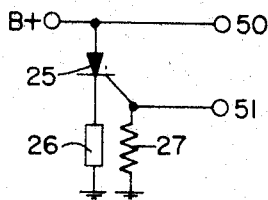
FIG. 5 shows an alternate input circuit for a fluid level indicator according to FIG. 3.

In FIG. 5 there is shown an alternate input circuit for a liquid level indicator according to FIG. 3. In order to accomplish the circuit, the circuitry encircled with a dotted line is substituted by the circuitry of FIG. 5 connecting terminal 50 to line 52 and terminal 51 to line 53.

The function of the indicator system is very advantageous since it insures safety of the cooled device upon loss of coolant when the alarm bulb is not noticed in time and no corrective action is undertaken.

Figure 4:
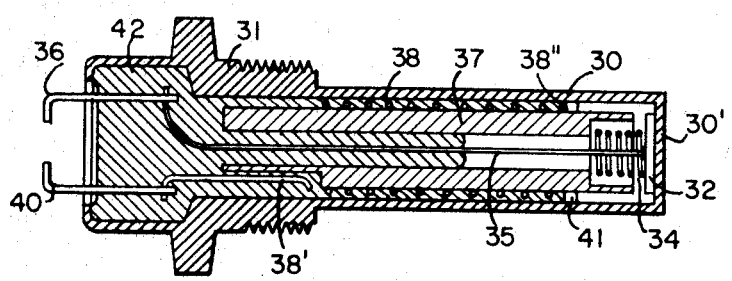
FIG. 4 illustrates an embodiment of the fluid level sensor device.

Referring now particularly to FIG. 4, there is illustrated an embodiment of the fluid level sensor device. The device comprises a thermally conductive shell 30 with a threaded portion 31 for mounting the device and grounding the shell. The thermistor 32 is pressed by a spring 34 against the bottom 30' of the shell, making electrical contact with the shell. This spring may also be a silicon rubber washer. The thermistor is further electrically connected by a lead 35 to a terminal 36. The lead 35 is wired through an inner aperture of heater form 37, around which form is wrapped a heating wire 38. The one end 38' of this heating wire is connected to a terminal 40, and the other end 38" is connected to contact ring 41, which makes electrical contact with the shell 30. Since the thermistor 32 and the heating wire 38 each have one terminal grounded, the circuit connections are simplified. An isolating material 42 is poured into the interior of the sensor device to insure a fixed arrangement of all parts of the device.

The heating element is made with a positive temperature coefficient metal so that as the temperature of the element increases the power it dissipates decreases. This is done so the upper temperature of the element is self-limiting and will eliminate self-destruction of the assembly through overheating. The PTC heater also provides the ability of fast warm-up since, when cold, the resistance is low and therefore, the current flow and power dissipated will be high.

The great advantage of the fluid level indicator system, and more particularly of the fluid level sensor device, is that the resistance variation of the thermistor results very rapidly with the failure of the coolant, because the heater causes the thermistor to warm up very fast. Therefore, the alarm device and/or alarm load operates with a very short time delay so that very sensitive devices can be effectively protected against damage.

All of the circuits described above and using transistors show PNP type transistors. However, NPN type transistors may also be used if desired.

What is claimed is:

1. A fluid level indicator including a negative temperature coefficient thermistor having two terminals for use with a coolant container, said indicator comprising in combination; a casing of high thermal conductivity type material located at a predetermined level in the container, a heating element having two terminals located inside said casing and transmitting heat to said high thermal conductivity type material, the thermistor thermally connected to the inside of said casing in a spaced position to said heating element, each one terminal of the thermistor and said heating element connected to a reference potential, a source of voltage coupled to the other terminal of said heating element, first resistor means coupled between the other terminal of the thermistor and said source of voltage, said heat transmission being rendered ineffective by the coolant cooling said casing, a transistor having input, output and control electrodes, said input electrode being connected to said source of voltage, a Zener diode and second resistor means series connected between said control electrode and the junction of the other terminal of the thermistor and said first resistor means, alarm load means and a silicon controlled rectifier having a gate series coupled between said source of voltage and said reference potential, third resistor means connected between said output electrode of said transistor and said gate, said Zener diode being sensitive to the change of the voltage across said first resistor caused by current increase through the thermistor when said high thermal conductivity type material is not being cooled by the coolant, and rendering said transistor and silicon controlled rectifier conductive thereby energizing said alarm load means.

References Cited

UNITED STATES PATENTS

| | | | |
|---|---|---|---|
| 2,861,159 | 11/1958 | Seney | 137—392 XR |
| 2,928,037 | 3/1960 | Lawrence | 137—392 XR |
| 3,049,887 | 8/1962 | Sharp et al. | 137—392 XR |

FOREIGN PATENTS

| | | |
|---|---|---|
| 381,811 | 8/1932 | Great Britain. |
| 772,064 | 4/1957 | Great Britain. |
| 937,237 | 9/1963 | Great Britain. |

JOHN W. CALDWELL, *Primary Examiner.*

DANIEL K. MYER, *Assistant Examiner.*

U.S. Cl. X.R.

317—132; 340—59